United States Patent Office 2,943,056
Patented June 28, 1960

2,943,056

CONSTANT VISCOSITY RADIATION RESISTANT LUBRICANT AND METHOD OF USING SAME

Robert O. Bolt, San Rafael, and James G. Carroll, Martinez, Calif., assignors, by mesne assignments, to the United States of America as represented by the United States Atomic Energy Commission No Drawing. Filed June 29, 1956, Ser. No. 595,015

6 Claims. (Cl. 252—48.2)

The present invention relates in general to conducting operations involving fluid organic substances under circumstances wherein those substances are subjected to nuclear radiation. More particularly the invention relates to an improved method for lubricating systems under radioactive environments and to improved lubricant compositions which are resistant to deterioration in the presence of nuclear radiation.

The derivation of useful nuclear power will often require the use, in an intensely radioactive environment of a reactor, of compositions of fluid organic compounds for functions dependent primarily on fluidity. Such compositions include especially lubricants as well as power transmission fluids and the like. However, as a general rule, nuclear radiation deleteriously reduces the fluidity of organic compounds, often to the extent of complete solidification in a short time. This is notable in the case of liquid hydrocarbons which include, to a large measure, the variety of liquids normally adapted to serve as efficacious lubricants and other such functional liquids in nonradioactive environments. For example, a representative conventional commercial petroleum hydrocarbon lubricating oil—i.e., paraffinic, solvent-refined western (United States) automotive oil, SAE–30—upon irradiation for four weeks in a reactor, thickened from its original viscosity range of medium-weight automotive oil to virtually a solid. In such instance the approximate cumulative of radiation dosage sustained amounted to about $1.7 \times 10^{18}$ slow neutrons per square centimeter and a proportionate dosage of gamma radiation and fast neutrons. This represents an exposure which is considered moderate in applications of organic materials around mobile reactors.

As a matter of definition the reactor radiation dosages herein are expressed as slow neutrons per square centimeter. This term is used because slow neutrons are easily measured and not because such neutrons are the most damaging to organic fluids. Indeed, the fast neutrons and gamma components of reactor flux cause more damage than slow neutrons. In graphite-moderated reactors, such as exist at Oak Ridge and Brookhaven National Laboratories, the fast neutron (above about 1 m.e.v. in energy) and gamma (1 m.e.v. average energy) components of radiation flux are present to the extent of about 20% and 50% respectively of the measured slow neutron component. Such slow neutrons are typically measured by the activation of cobalt; or cobalt-aluminum alloy monitors are exposed both alone and covered with a cadmium shield. The subtraction of the activity of the shielded monitor from the activity of the unshielded monitor yields data from which the slow neutron dosages can be calculated. The dosage values used herein were obtained in such a manner.

As indicated above, the loss of fluidity due to nuclear radiation in compositions of fluid organic substances has imposed a serious obstacle to the successful design and utilization of nuclear power plants. This effect tends to necessitate resort to constant disposal and replacement of thickened radiation exposed fluids with a continual supply of fresh fluids so as to sustain the functions of said fluids. Further, it is desirable that the compositions not only remain fluid but also not change appreciably in viscosity upon continued exposure to nuclear radiation. Also, lubricant compositions should give low wear of the bearing metals in the presence of nuclear radiation.

Accordingly, one object of the present invention is to provide a new and improved method of lubricating systems exposed to nuclear radiation. Another object is to provide improved radiation-resistant lubricant compositions having a low rate of viscosity change in the presence of nuclear radiation. Other objects will become apparent from the following description of the invention.

The foregoing objects are attained by the use of lubricant compositions based on certain mixtures of alkylaromatics and poly (propene oxide). Lubricants with relatively small viscosity change induced by nuclear radiation are attained with such mixtures containing the poly (propene oxide), which tends to decrease in viscosity upon exposure to nuclear radiation, in an amount, within the range of 10–70% of the mixture, to offset increase of the lubricant due to the tendency of the alkylaromatic component to increase in viscosity upon exposure to nuclear radiation. In many instances, a preferred mixture of 40–60% of poly (propene oxide) and the remainder essentially alkylaromatics will yield a lubricant composition highly resistant to large accumulations of radiation and large amounts of radiation. These compositions also will usually have outstanding wear characteristics in radioactive environments, and often the wear characteristics will improve upon continued exposure to nuclear radiation.

The foregoing mixtures of poly (propene oxide) and alkylaromatics are radiation resistant and in the proper viscosity range are useful as general lubricants as well as insulating oils, hydraulic fluids, gear lubricants, dash pot oils, scientific instrument lubricants, shock absorber oils and the like which exhibit relatively little change in viscosity upon exposure to nuclear radiation.

The poly (propene oxide) component is more specifically described by the formula:

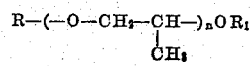

wherein R and $R_1$ represent hydrogen, alkyl, aryl, alkaryl and the like hydrocarbon radicals and $n$ is a number selected to give an average molecular weight of about 200 to 2000 for the portion of the molecule within the parentheses. In some instances, the molecular weight may be higher so long as the mixture has a viscosity appropriate, in combination with the other components, for the particular service for which the composition is to be used. As examples may be mentioned polymers of propene oxides, e.g., 1,2-propene oxide, wherein the polymerization may be initiated with aliphatic or aryl monohydric alcohols or esters, and the remaining terminal hydroxy groups of the polymer may be esterified or etherified. Suitable polyethers are further described in application Serial No. 380,145, filed September 8, 1953, for a Method of Resisting Irradiation-Induced Viscosity Increase of Organic Fluids, in the names of G. H. Denison, F. A. Christiansen, R. O. Bolt and J. W. Kent. A further advantage of the polyethers is that nuclear radiation enhances the antiwear, antiseizure and general lubricity qualities of the polyethers.

The alkylaromatic component is further identified as an aromatic compound (or mixture of aromatic compounds) wherein the aromatic portion may be derived from benzene, naphthalene, biphenyl, terphenyl and the like and the aromatic ring portion is substituted with one or more alkyl groups, preferably up to a total of about 35 carbon atoms in alkyl side chains. Usually most suitable are alkylaromatics having an average molecular weight above 200, preferably up to about 400. The 5% boiling point for such alkylaromatic mixtures is most suitably above 500° F. The alkyl aromatics are exemplified by technical mixtures of alkylbenzenes of molecular weights approximately of the order of 250 to 400, derived as by-product high-molecular-weight bottoms in detergent alkylbenzene manufacture.

Also practically applicable are various liquid individual organic hydrocarbon compounds, especially long-chain paraffins and long-chain-paraffin-substituted aromatics, typified by octadecylbenzene:

which approximates the viscosity of textile spindle oil, amylbiphenyl, also approximating the viscosity of textile spindle oil, hexadecane (i.e., cetane), which approximates the consistency of light instrument oil, and polyamylnaphthalenes. Other examples of alkylaromatic hydrocarbon oils are octadecyl-alpha-methyl naphthalene, octadecyldiphenylmethane, and octadecyldiphenyl.

The presence of additives in the mixture of poly (propene oxide) and alkylaromatics are normally unobjectionable, unless they adversely react with components of the mixture or are themselves undesirable in a nuclear radiation environment. These additives, in their own specific manners, enhance the value of the compositions and consequently tend to improve the over-all efficiency of the resulting lubricant composition. For example, it may sometimes be desirable to incorporate in the oil composition small amounts of antioxidants, of which are preferred the organo selenides such as the dialkyl and diaryl mono-selenides (as disclosed in application Serial No. 380,144, filed September 8, 1953, in the names of F. A. Christiansen, J. W. Kent, R. O. Bolt and G. H. Denison, for a Method of Inhibiting Radiation Damage to Organic Fluids. Especially in the presence of metals, e.g., iron, copper or silver, the oil composition will preferably contain small amounts of metal deactivators such as alizarin, quinizarin or other dihydroxy anthraquinones and thiazoles such as mercaptobenzothiazole, to aid in inhibiting the adverse thickening of the oil composition in services involving exposure to nuclear radiation. Sometimes also desirable are inhibitors of free radical reactions (i.e., scavengers for free radicals), which inhibitors are preferably iodo-substituted aromatic compounds such as iodobenzene, iodonaphthalene, iodobiphenyl and like compounds, as disclosed in application Serial No. 380,147, filed September 8, 1953, in the names of R. O. Bolt, J. G. Carroll, J. W. Kent, F. A. Christiansen and G. H. Denison for a Method of Inhibiting Irradiation Induced Viscosity Increase of Organic Fluids.

These secondary additives, namely, the oxidation inhibitors, metal deactivators and free radical scavengers are generally employed in small amounts such as 0.005–1% to 5–10%, by weight of the oil composition.

In the following examples, the viscosity change is employed as the primary criterion of determination. The index of damage, $\eta_1$ (or $\eta_{10}$), is defined as the viscosity of an irradiated fluid at the temperature, $T_1$ (or $T_{10}$), at which the viscosity of the starting material was one centistoke (cs.) (or 10 cs.). This index provides a common comparative basis for fluids of widely differing viscosities. By this means the initial viscosity of each fluid begins at one cs.; and viscosity change can be measured in terms of deviation from this common point.

The following examples further illustrate the compositions and methods of the present invention:

EXAMPLE I

A liquid lubricant composition of 49.95% poly (propene oxide), 45% mixed alkylbenzenes of 330–340 average molecular weight, 5% didodecyl selenide and 0.05% of quinizarin was exposed in open, Pyrex glass vessels to varying amount of neutron flux and the amount of damage as indicated by viscosity change noted, as shown in the following Table I. This lubricant composition is roughly equivalent to an oil in the SAE 10 to 30 grades. The poly (propene oxide) was of the structure $$C_6H_5-(O-CH_2-CH-CH_3-)_nOCH_3$$

and had an average molecular weight of about 1000. The alkylbenzenes were obtained as a by-product high molecular weight bottoms in detergent alkylbenzene manufacture from alkylation of benzene with propene polymer, the mixture consisting largely of dialkylbenzenes with the para isomer predominating. The exposure was at 25° C. to a $Co^{60}$ gamma rays from a 600 Curie source of the Brookhaven tube type (see Nucleonics, vol. 9, pp. 10–13; 1951) which gives a flux of $1.69 \times 10^5$ R./hr. or $4.06 \times 10^6$ R./day.

*Table I*

| Test No. | Exposure | | Viscosity (Centistokes) | | Viscosity Index | Index of Damage | |
|---|---|---|---|---|---|---|---|
| | Days | R×10⁸ | at 100° F. | at 210° F. | | $T_{10}$ | $\eta_{10}$ |
| 1 | 0 | 0 | 34.0 | 6.02 | 130 | 170 | 10 |
| 2 | 1 | 0.04 | 34.1 | 6.03 | 130 | | 10 |
| 3 | 5 | 0.20 | 34.0 | 5.97 | 128 | | 10 |
| 4 | 10 | 0.41 | 34.0 | 5.94 | 128 | | 9.9 |
| 5 | 20 | 0.82 | 34.2 | 5.87 | 123 | | 9.8 |
| 6 | 40 | 1.63 | 35.2 | 5.90 | 120 | | 9.7 |
| 7 | 47 | 1.90 | 33.2 | 5.57 | 115 | | 9.2 |

The foregoing data illustrate that the viscosity of the combination of alkylbenzenes and poly (propene oxide) remains fairly constant for neutron flux dosages at least up to about $2 \times 10^8$ R.

EXAMPLE II

For comparison with the foregoing data, Fluid A below was made up of 5% didodecyl selenide, 5% iodonaphthalene, 0.1% quinizarin and the remainder the poly (propene oxide) of Example I and another fluid (Fluid B below) was prepared with the same ingredients as in Fluid A except that di(2-ethylhexyl sebacate) was used in place of the poly (propene oxide). These fluids were similarly exposed to varying amounts of neutron flux with the viscosity changes as shown in the following table:

*Table II*

| Dosage, R | Index of Damage, $\eta_{10}$ | | |
|---|---|---|---|
| | ~10⁹ | 4.0×10⁹ | 4.4×10⁹ |
| Fluid A | 8.4 | 5.4 | 4.7 |
| Fluid B | 11 | 36 | 110 |

Although the viscosity change indicates the poly (propene oxide) fluid is superior to the sebacate fluid, the mixtures of poly (propene oxide) and alkylbenzenes are substantially constant viscosity, as illustrated in Example I.

EXAMPLE III

For further comparison with the compositions of the present, a composition of 5% didodecyl selenide, 0.1% quinizarin and the remainder the alkylbenzenes used in Example I was similarly exposed at 25° C. to a neutron flux dosage of $19.3 \times 10^8$ R. in a closed magnesium vessel under a helium atmosphere. The source had an average gamma energy of about 1 m.e.v. and consisted of a surrounding array of discharged enriched uranium fuel elements from a canal gamma reactor. The effects of the irradiation are illustrated by the viscosity changes given in the following table:

Table III

|  | Viscosity (Centistokes) | | | Index of Damage $\eta_{10}$ at 130° |
| --- | --- | --- | --- | --- |
|  | at 100° F. | at 130° F. | at 210° F. | |
| Orig | 19.9 | 10.2 | 3.23 | |
| Irrad | 25.9 | 13.2 | 4.08 | 13.2 |

Although this invention has been described with particular emphasis upon the currently important application to nuclear power plant services, it is inherently of much wider applicability. In pursuits other than power generation, where such organic fluids are unprotectedly disposed in the proximity of neutronic reactors, the instant invention may likewise afford beneficial results. Moreover, aside from neutronic reactors, this procedure may be applied to resist damage from the same types of deleterious radiation, especially neutrons and gamma rays, emitted from other conventional radiation sources of same, such as radium-beryllium neutron sources, and nuclear reactions effected by means of Van de Graaff-generator-energized linear accelerators, and cyclotrons, and the like. Various additional applications of the hereinbefore-disclosed method will become apparent to those skilled in the art. It is therefore to be understood that all matters contained in the above description and examples are illustrative only and do not limit the scope of the present invention.

We claim:

1. A nuclear-radiation-resistant lubricant whose radiation-induced viscosity change is relatively small, which composition consists essentially of a mixture of alkylaromatics having an average molecular weight in the range of 200 to about 400 and the alkyl side chains have up to about 35 carbon atoms total therein and poly (propene oxide) which has the structure represented by

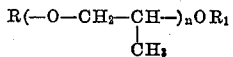

wherein R and R₁ are radicals selected from the group consisting of hydrogen, alkyl, aryl and alkaryl radicals and $n$ is a number selected to give an average molecular weight of about 200 to 2000 for the portion of the molecule within the parentheses wherein said poly (propene oxide) component tends to decrease in viscosity upon exposure to nuclear radiation and is present in an amount, within the range of 10–70% of the mixture, to offset a substantial part of the viscosity increase of the lubricant due to the tendency of the alkylaromatic component to increase in viscosity upon exposure to nuclear radiation.

2. The lubricant composition of claim 1 which contains an addition of a small amount of an organic selenide selected from the group consisting of dialkyl and diaryl monoselenides and an oil-soluble metal deactivator selected from the group consisting of dihydroxy anthroquinones and thiazoles.

3. The lubricant composition of claim 1 wherein said alkylaromatics have a 5% boiling point of above 500° F.

4. The lubricant composition of claim 1 wherein said poly (propene oxide) component is present in an amount within the range of 40–60% of the mixture.

5. The lubricant composition of claim 1 wherein said alkylaromatics are technical mixtures of alkylbenzenes having molecular weights of 250 to 400 present in an amount within the range of 40–60% of the mixture together with effective amounts of an organic selenide selected from the group consisting of dialkyl and diaryl monoselenides and of an oil-soluble metal deactivator selected from the group consisting of dihydroxy anthroquinones and thiazoles and of an iodo-substituted aromatic compound free radical reaction inhibitor.

6. The improved method for the lubrication of a system being subjected to nuclear radiation, which comprises lubricating said system with a radiation-resistant lubricant composition consisting essentially of a mixture of alkylaromatics having an average molecular weight in the range of 200 to about 400 and the alkyl side chains have up to about 35 carbon atoms total therein and poly (propene oxide) which has the structure represented by

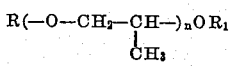

wherein R and R₁ are radicals selected from the group consisting of hydrogen, alkyl, aryl and alkaryl radicals and $n$ is a number selected to give an average molecular weight of about 200 to 2000 for the portion of the molecule within the parentheses wherein said poly (propene oxide) component tends to decrease in viscosity upon exposure to nuclear radiation and is present in an amount, within the range of 10–70% of said mixture, to offset a substantial part of the viscosity increase of the lubricant composition due to the tendency of the alkylaromatic component to increase in viscosity upon exposure to nuclear radiation.

References Cited in the file of this patent

UNITED STATES PATENTS 2,672,447   Stewart _____ Mar. 16, 1954

OTHER REFERENCES

Mincher-KAPL-731, April 2, 1952, declassified February 15, 1955. Copy available from Office of Technical Services, Wash., D.C., pages 3–7.